(12) United States Patent
Jerchen et al.

(10) Patent No.: US 12,420,762 B2
(45) Date of Patent: Sep. 23, 2025

(54) ELECTRONICALLY COMMUTATED MACHINE AND ELECTRONICALLY SLIP-CONTROLLABLE BRAKING SYSTEM HAVING AN ELECTRONICALLY COMMUTATED MACHINE

(71) Applicant: Robert Bosch GmbH, Stuttgart (DE)

(72) Inventors: Adrian Jerchen, Marbach (DE); Christoph Keyl, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 385 days.

(21) Appl. No.: 18/246,134

(22) PCT Filed: Sep. 22, 2021

(86) PCT No.: PCT/EP2021/076026
§ 371 (c)(1),
(2) Date: Mar. 21, 2023

(87) PCT Pub. No.: WO2022/063809
PCT Pub. Date: Mar. 31, 2022

(65) Prior Publication Data
US 2023/0356704 A1    Nov. 9, 2023

(30) Foreign Application Priority Data
Sep. 28, 2020  (DE) ............... 10 2020 212 192.3

(51) Int. Cl.
*B60T 13/74*   (2006.01)
*G01D 5/14*   (2006.01)
(Continued)

(52) U.S. Cl.
CPC ............ *B60T 13/74* (2013.01); *G01D 5/145* (2013.01); *H02K 11/215* (2016.01); *H02K 29/08* (2013.01); *F16D 2066/003* (2013.01)

(58) Field of Classification Search
None
See application file for complete search history.

(56) References Cited

U.S. PATENT DOCUMENTS 5,789,917 A * 8/1998 Oudet .................... G01D 5/145
                                                    324/207.2
7,109,615 B2   9/2006 Doemen et al.
(Continued)

FOREIGN PATENT DOCUMENTS

DE   10 2015 216 454 A1   3/2017
DE   10 2017 218 648 A1   4/2019
(Continued)

OTHER PUBLICATIONS

International Search Report corresponding to PCT Application No. PCT/EP2021/076026, mailed Dec. 20, 2021 (German and English language document) (5 pages).

*Primary Examiner* — Devon C Kramer
(74) *Attorney, Agent, or Firm* — Maginot, Moore & Beck LLP

(57) ABSTRACT

The disclosure relates to an electronically commutated machine, more particularly an electronically commutated motor having a rotor on a rotor shaft, which rotor shaft can be actuated to rotate. For sensing of an angle of rotation of the rotor shaft, a signaling means is provided, which comprises a retaining element and a magnetic element disposed on the retaining element. A retaining element made of ferromagnetic material is proposed, the magnetic element being placed onto the retaining element from the outside and being retained thereon by magnetic force. The proposal makes it possible to dispense with costly adhesive connections between the magnetic element and the retaining element. The disclosure further relates to an electronically slip-controllable braking system having an electrically commutated machine.

9 Claims, 3 Drawing Sheets

(51) Int. Cl.
    *H02K 11/215*    (2016.01)
    *H02K 29/08*    (2006.01)
    *F16D 66/00*    (2006.01)

(56) References Cited

U.S. PATENT DOCUMENTS

| | | | |
|---|---|---|---|
| 10,352,994 B2* | 7/2019 | Ahrens | G01R 31/2884 |
| 12,123,715 B2* | 10/2024 | Tanaka | H01F 7/02 |
| 2008/0272660 A1* | 11/2008 | Becker | G01P 1/04 |
| | | | 310/43 |
| 2011/0181221 A1* | 7/2011 | Asahi | H02K 29/08 |
| | | | 318/400.39 |
| 2016/0141940 A1* | 5/2016 | Hager | F16D 1/06 |
| | | | 403/341 |
| 2019/0372434 A1 | 12/2019 | Heo | |
| 2020/0099269 A1* | 3/2020 | Suzuki | H02K 5/10 |
| 2020/0153314 A1* | 5/2020 | Iwasaki | H02K 7/003 |
| 2021/0328468 A1* | 10/2021 | Loeffler | H02K 7/075 |

FOREIGN PATENT DOCUMENTS

| | | | |
|---|---|---|---|
| JP | 2009-240083 A | | 10/2009 |
| JP | 2014-57431 A | | 3/2014 |
| JP | 2016-39701 A | | 3/2016 |
| JP | 2017-95041 A | | 6/2017 |
| JP | 2018-72086 A | | 5/2018 |
| JP | 2019-77436 A | | 5/2019 |
| WO | 2015/048956 A2 | | 4/2015 |

\* cited by examiner

![](US 12,420,762 B2)

ELECTRONICALLY COMMUTATED MACHINE AND ELECTRONICALLY SLIP-CONTROLLABLE BRAKING SYSTEM HAVING AN ELECTRONICALLY COMMUTATED MACHINE

This application is a 35 U.S.C. § 371 National Stage Application of PCT/EP2021/076026, filed on Sep. 22, 2021, which claims the benefit of priority to Serial No. DE 10 2020 212 192.3, filed on Sep. 28, 2020 in Germany, the disclosures of which are incorporated herein by reference in their entirety.

The disclosure relates to an electronically commutated machine according to the features of the disclosure, and to an electronically slip-controllable braking system having an electronically commutated machine according to the features of the disclosure.

Electronically commutated machines are used, for example, in electronically slip-controllable braking systems of motor vehicles as drive units in order to drive a pressure generator in the context of brake pressure control. Electrical control of the machines is carried out as required by an electronic control unit of the braking system. In the case of electrical control, the pressure generator conveys a pressure medium within a brake circuit. A brake pressure subsequently builds up in wheel brakes connected to the brake circuit in accordance with the pressure medium volume conveyed. Using further valve apparatuses that can be controlled by the electronic control unit, this brake pressure can be adjusted in a wheel-specific manner to the slip conditions currently prevailing at the respective wheels of the vehicle. Wheel locking can thus be prevented during a braking operation and the driving stability of a vehicle can consequently be improved. In addition, braking processes can be carried out independently of the driver depending on the current traffic or driving situation.

The volume of pressure medium displaced by the pressure generator into the brake circuit represents a significant control variable in these control processes. It can be determined from the operating parameters of the drive unit. For this purpose, an existing sensor apparatus detects the angle of rotation and/or the rotational speed of the rotor of the drive unit and forwards the measured signal to the electronic control unit for a corresponding computational evaluation. Moreover, an essential purpose of the sensor apparatus is the determination or optimization of the electrical control of the drive unit.

Known sensor apparatuses are constructed from a signaling means rotating with the rotor shaft and a signal receiver disposed in a stationary manner. The signaling means comprise at least one magnetic element that is fastened to the rotor shaft of the drive unit by means of a retaining element.

BACKGROUND

An electronically commutated machine is part of the prior art and is disclosed, for example, in DE 10 2017 218 648 A1. The known machine is a drive unit for a pressure generator of an electronically slip-controllable vehicle braking system, which is shown in FIG. 1 of this document in a side view.

The known drive unit (10) comprises an electronically commutated electric motor (12), which has a rotor (14) that can be driven to a rotational movement, and a rotor shaft (16) which is connected to said rotor (14) in a rotationally fixed manner. The rotor (14) has a conventional design and has an iron core and a plurality of permanent magnets disposed next to one another in the circumferential direction of said iron core.

In a known manner, the magnetic fields of these permanent magnets interact with the magnetic fields of electrical coils of a stator. Said stator is disposed in a housing (18) of the drive unit (10). The housing (18) is equipped with the electrical coils on an inner surface opposite the permanent magnet. Due to the interaction between the magnetic fields, the rotor (14) and the rotor shaft (16) execute a common rotational movement.

By way of example, the rotor shaft (16) is rotatably mounted in the housing (18) of the drive unit (10) by means of roller bearings (20). According to FIG. 1, a plurality of eccentric elements (22) are disposed on the rotor shaft (16) by way of example in order to actuate apparatuses (not shown), for example piston pumps that are disposed transversely to the longitudinal axis L of the rotor shaft (16).

The detail II according to FIG. 1 shows a signaling means (24) of a sensor apparatus for electronically detecting and evaluating the angle of rotation and/or the rotational speed of the rotor (14) or the rotor shaft (16). This signaling means (24) is disposed on the end of the rotor shaft (16) remote from the rotor (14). It has a magnetic element (26) that is indirectly fastened to the rotor shaft (16) via a retaining element (28). The retaining element (28) is designed in the shape of a cup and has a protruding mandrel (30) with which it is pressed into an associated centering bore (32) of the rotor shaft (16) and glued therein (adhesive joint not visible). A blind-hole-like receptacle (34), which is open to the outside and into which the magnetic element (26) is inserted, is formed on the opposite side of the retaining element (28). The magnetic element (26) is also fixed in the receptacle (34) of the retaining element (28) by means of an adhesive joint (not visible).

Under operating conditions of this drive unit, the rotor (14) is strongly accelerated or decelerated. In this case, the adhesive joints are subject to high dynamic loads and thus correspondingly prone to faults. A fastening of the magnetic element (26) to the retaining element (28) is subject to a certain elasticity due to the adhesive joints, as a result of which the measurement tolerance is relatively large when the sensor position or the angle of rotation is detected. Apart from this, adhesive joints in series production require a large expenditure for care-intensive apparatuses, for example for metering and curing an adhesive. The necessary retaining element and the centering bore on the rotor shaft give rise to further costs.

SUMMARY

In contrast, an electronically commutated machine according to the features of the disclosure has the advantage that adhesive joints for rotationally fixed anchoring of the magnetic element to the rotor shaft can be dispensed with. The connection is thus more rigid and more reliable than in the described prior art, which results in more precise detection of the rotational angle signal or the rotor speed and ultimately in an improvement in the electrical controllability of the machine. Deviations between an actually conveyed pressure medium volume and a desired setpoint value or between the set brake pressure and the setpoint brake pressure can thereby be reduced. Furthermore, the production process of the machine is shortened because there is no need to wait for necessary preparation of adhesive locations or for an adhesive to cure. Metering apparatuses, possibly necessary UV curing apparatuses or temperature treatment devices for the adhesive are additionally dispensed with.

The use of a cup-shaped retaining element made of ferromagnetic material to which the magnetic element is applied from the outside and retained by magnetic force is proposed.

Such a retaining element can preferably be produced by means of reshaping and thereby with a relatively thin wall thickness at low costs. When the magnetic element is applied to the retaining element, maximum magnetic saturation largely occurs in the material of said retaining element. The magnetic retaining force is thereby strong enough to withstand the mechanical forces acting on the magnetic element. In addition, due to its thin wall or its magnetic saturation, the retaining element does not have any effect that influences the magnetic field of the magnetic element.

Further advantages or advantageous developments of the disclosure can be found in the following description.

According to a first advantageous development of the disclosure, the retaining element is fastened to the circumference of the rotor shaft by means of a clamping body located in a gap between the outer circumference of the rotor shaft and an inner diameter of the retaining element.

A tolerance ring made of spring steel that is currently on the market is suitable as a clamping body for this purpose. This enables the use of a cost-effective rotor shaft having a continuously constant, i.e., not stepped, shaft diameter. Due to the existing clamping body, the radial dimensions of a retaining element increase, which retaining element thus provides a larger installation space for a magnetic element. Corresponding larger magnetic elements that project beyond the cross section of the rotor shaft provide stronger and more homogeneous magnetic fields that can be detected and evaluated more easily by the signal receiver. The angle of rotation covered or the rotational speed of the rotor shaft can thus be determined with higher precision or more cost-effective signal receivers and magnetic elements of coarser tolerance can be used. The latter in turn simplifies the mutual exchangeability of components such as, for example, the control unit and electric machine.

A mechanical fixing device that is formed on the retaining element and fixes the magnetic element in a form-fitting manner in and against the direction of rotation of the rotor shaft on the retaining element is furthermore advantageous. Rotational movements of the magnetic element relative to the retaining element are thereby effectively prevented.

In one embodiment of the disclosure, the required fixing devices are designed to be cost-effective and formed in one piece with the retaining element. They can be machined on a base of the retaining element, for example by punching and bending a window or, alternatively, by means of reshaping.

In a first embodiment variant shown in FIGS. 2 and 3, the fixing device has tabs that are punched out from the retaining element and vertically bent, which tabs protrude from the retaining element in the axial direction and act on the circumferential surface of the magnetic element. Certain tabs are provided in order to rest against assigned key or contact surfaces of the magnetic element.

In a second embodiment variant shown in FIG. 4, the fixing device is manufactured solely by means of reshaping.

BRIEF DESCRIPTION OF THE DRAWINGS

Embodiments of the disclosure are illustrated in the drawings and explained in more detail in the following description.

The drawings comprise a total of 5 figures in which corresponding components are provided with uniform reference signs.

DETAILED DESCRIPTION

Figure 2:
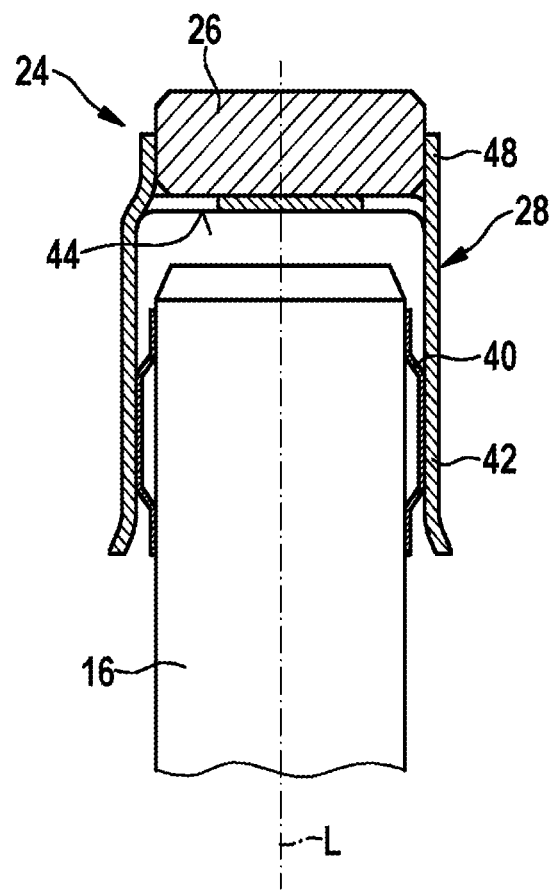
FIG. 2 shows detail II according to FIG. 1 in a first embodiment according to the disclosure in a side view.

FIG. 2 shows an end of a rotor shaft (16) of an electronically commutated machine. This end is opposite a second end (not shown) to which a rotor of said electric machine is attached. The rotor shaft (16) has a constant outer diameter and is cut perpendicularly to the longitudinal axis L, i.e., has a shaft end side oriented perpendicularly to said longitudinal axis L. A transition from the shaft end side to the shaft circumference is designed as a circumferential bevel, for example.

Figure 1:
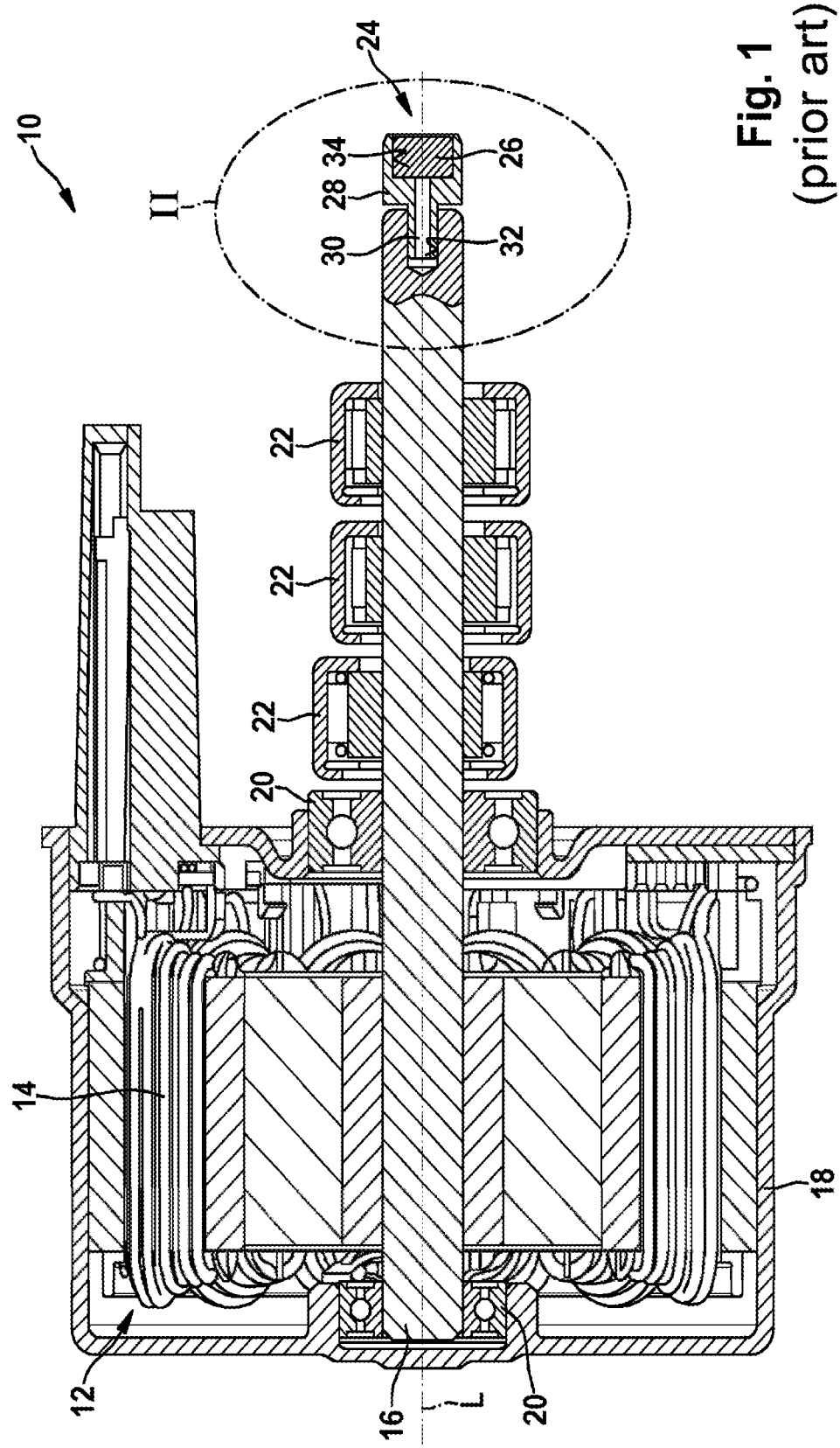
FIG. 1 shows the essential components of an electronically commutated machine known from the prior art and already explained in the introduction to the description in longitudinal section.

A clamping body (40) in the form of a tolerance ring is attached to the illustrated end of the rotor shaft (16). Said tolerance ring is designed as a cylindrical sleeve that can be closed on the circumferential side or slotted on the circumferential side. Viewed in the direction of the longitudinal axis L of the rotor shaft (16), the clamping body (40) is divided into a rotor-side first clamping body portion that rests flush against the outer circumference of the rotor shaft (16) under adjustable radial preloading. This first clamping body portion transitions into a central portion on which, by way of example, disk-shaped formations are formed that project radially outward from the clamping body (40). It is not shown in FIG. 1 that a plurality of such formations are disposed at regular intervals along the entire circumference of the clamping body (40). These formations have a trapezoidal cross section having a largely flat plate base and circumferential, obliquely aligned flanks via which this plate base is physically connected to the rest of the clamping body. An air space is enclosed between the plate base and the outer circumference of the rotor shaft (16), by means of which air space the formations impart elasticity to the clamping body (40) in the radial direction.

Adjoining the central portion of the clamping body (40) is an end portion that, comparably to the first clamping body portion, in turn rests against the circumference of the rotor shaft (16) under radial preloading.

A cup-shaped retaining element (28) having a cylindrical retaining element shaft (42) and a retaining element base (44) that closes off an end of said retaining element shaft (42) is pushed with its open end forward onto the clamping body (40). The rotor shaft (16) thus projects in portions into the interior of the retaining element (28). An axial distance remains between the retaining element base (44) and the shaft end face of the rotor shaft (16) in the direction of the longitudinal axis L in order to avoid any magnetic interactions between a magnetic element (26) and the rotor shaft (16).

An inner diameter of the retaining element (28) is matched to an outer diameter of the clamping body (40) in the region of the formations such that, by pushing the retaining element (28) onto the clamping body (40), radial forces are generated between said retaining element (28) and the clamping body (40), on the one hand, and between the clamping body (40) and the rotor shaft (16), on the other hand, which radial forces are sufficiently strong to fix the retaining element (28) in an axially and rotationally fixed manner on the clamping body (40) and at the same time to fix the clamping body (40) in an axially and rotationally fixed manner on the rotor shaft (16). The effective radial forces can be adjusted by means of mutual structural coordination of the dimensions of the retaining element (28), the clamping body (40) and the rotor shaft (16). In the final assembled state of the signaling means (24), the retaining element shaft (42) covers the clamping body (40) on the circumferential side.

The cup-shaped retaining element (28) consists of ferromagnetic material and is manufactured with a relatively thin wall thickness. In order to produce the retaining element (28), a reshaping method is preferably used, preferably a deep-drawing method, because, with such a deep-drawing method, hollow bodies that are open on one side and have a thin wall thickness are particularly cost-effective to produce.

On the retaining element base (44), a magnetic element (26) is applied to the retaining element (28) from the outside on an end face remote from the rotor shaft (16) and is retained there by magnetic force. Due to its thin wall, maximum magnetic saturation then arises in the material of the retaining body (28). This results in a high magnetic holding force on the one hand and a sufficiently small influence on the magnetic field of the magnetic element (26) on the other hand.

Figure 5:
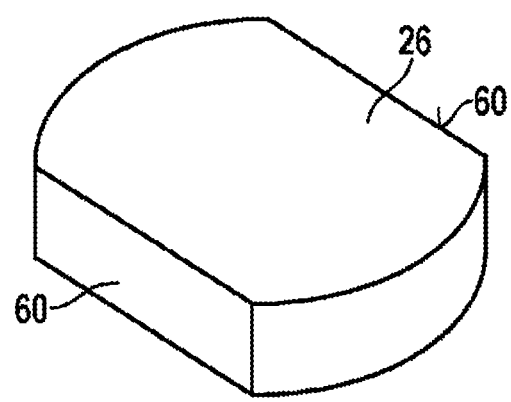
FIG. 5 shows a magnetic element as a single part in a spatial representation.

This magnetic element (26) in turn is cylindrical, but has at least one pair of circumferential flattened portions (60; FIG. 5), referred to as wrench surfaces, on the circumference for rotationally fixed fixing thereof with respect to the retaining element (28).

The retaining element (28) is equipped with a mechanical fixing device (48; 50-54), by means of which the magnetic element (26) is disposed in a radially and rotationally fixed manner on the retaining element (28) and centered on the retaining element (28). By way of example, this fixing device (48; 50-54) comprises tabs (48a, b) which are designed in one piece with the retaining element (28) for this purpose and protrude axially outward from the retaining element (28) in the direction of the longitudinal axis L. These tabs (48a, b) rest in a form-fitting manner with their inner sides against associated portions of the circumferential surface and against the flattened portions (60) of the magnetic element (26). By way of example, the tabs (48a, b) are disposed on the retaining element base (44). For their production, three flanks of a window that are perpendicular to one another are punched out of the retaining element base (44) and the segment enclosed by the flanks is bent at right angles to the outside along the non-punched fourth flank. The magnetic element (26) is thus fastened to the retaining element (28) without additional adhesive joints.

Figure 3:
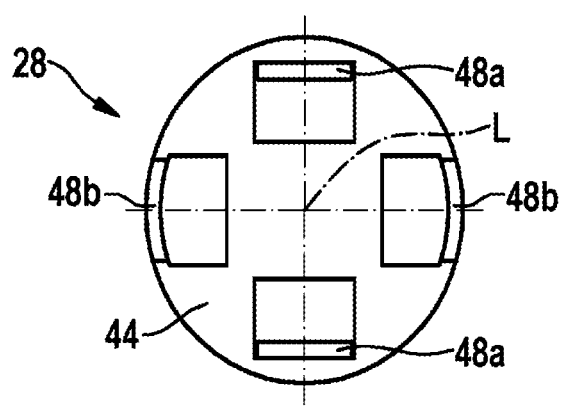
FIG. 3 shows the retaining element of the first embodiment of the disclosure in a plan view and FIG. 4 shows an alternative second embodiment of the disclosure, again in a side view.

FIG. 3 shows the retaining element (28) according to FIG. 2 from above. For example, a total of four windows can be seen on the retaining element base (44). A segment of the retaining element base (44) enclosed by three punched flanks of this window in each case forms a tab (48a, b) that is bent perpendicularly and protrudes from the plane of the drawing. The total of four illustrated tabs (48a, b) are connected to the retaining element base (44) with their fourth flank, which lies closest to the outer circumference of the retaining element (28).

In each case, two of these tabs (48a) lie opposite one another in a plane-parallel manner. They are intended to rest against the flattened portions (60) of the magnetic element (26). In contrast thereto, the tabs (48b) in each case located therebetween are curved and extend along a circumferential portion of the retaining element (28). They are provided to rest against a circumferential portion of the magnetic element (26) that is likewise curved. Accordingly, the magnetic element (26) is in the space between the tabs (48a, b) and fills said space with its cross section.

Figure 4:
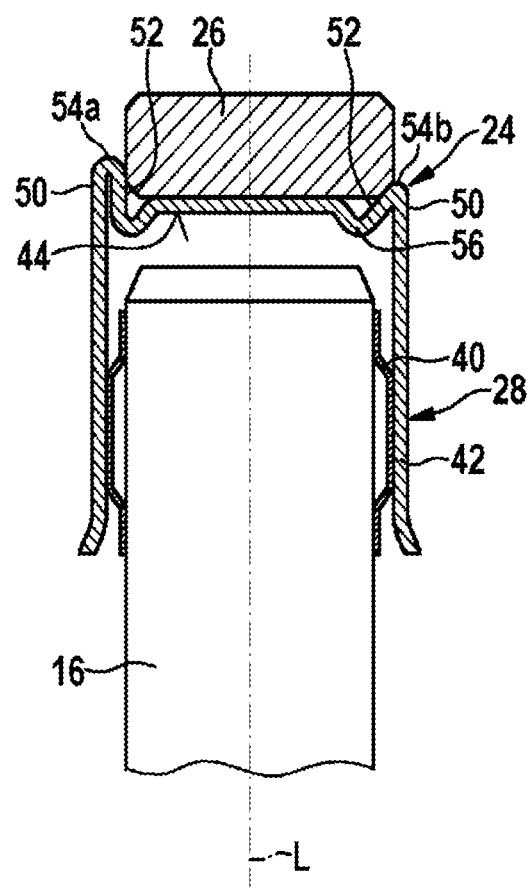

FIG. 4 shows a second embodiment of the disclosure in a side view. In this second embodiment, the retaining element (28), like the retaining element (28) according to the first embodiment according to FIG. 2, is cup-shaped and is produced from ferromagnetic material. Furthermore, the magnetic element (26) rests against a retaining element base (44) from the outside and is retained by magnetic force.

The retaining element (28) according to FIG. 4 differs from that according to FIG. 2 in that the fixing device (50-54) holding the magnetic element (26) can be produced solely by means of reshaping. Advantageously, punching and bending operations for producing the retaining element (28) can thereby be dispensed with.

In the second embodiment, the fixing device (50-54) is produced inwardly by turning over or folding the wall of the retaining element (28) once. In the region of the fixing device (50-54), the wall is therefore doubled, such that the fixing device (50-54) comprises an outer first leg (50), an inner second leg (52) and a connecting portion (54a, b) between the legs. Said connecting portion (54a, b) is located on the end of the fixing device (50-54) that projects axially in the direction of the longitudinal axis L and can be rounded or designed as a radius, as shown in FIG. 4 on the left-hand side, or alternatively be pointed or designed as an edge, as shown in FIG. 4 on the right-hand side. In the region of a rounded connecting portion (54a), the fixing device (46) projects axially further in the direction of the longitudinal axis L than in the region of a pointed connecting portion (54b). The rounded connecting portion (54a) is provided to rest flush against one of the flattened portions (60) or wrench surfaces of a magnetic element (26), while the pointed connecting portion (54b) is located on the rounded circumferential portion of the magnetic element (26). Pointed or rounded connecting portions (54a, b) are present in mutual alternation and in each case in a plurality along the circumference of the retaining element (28).

In this second embodiment, the retaining element base (44) of the retaining element (28) is connected to the inner second leg (52) of the fixing device (46) by means of a ring-shaped groove (56) that is rounded at its base and open toward the surroundings of the retaining element. The magnetic element (26), which is retained in a rotationally fixed and centered manner by the fixing device (46), is dimensioned or shaped such that it covers the opening of the groove (56) with its cross section.

As in the embodiment according to FIG. 2, an end face of the magnetic element (26) remote from the retaining element (28) protrudes axially relative to the fixing device (48; 50-54) of the retaining element (28) in the direction of the longitudinal axis L. The components not explained in greater detail in connection with the description of FIG. 4 are otherwise identical to the components of the embodiment according to FIG. 2.

Finally, in FIG. 5, for the sake of completeness, the magnetic element (26) is also shown as a single part in a spatial representation. As already explained, this magnetic element (26) has a cylindrical shape with mutually opposite end faces that are parallel to one another. On its circumference, the magnetic element (26) has two flattened portions (60) extending in parallel with one another.

Of course, amendments or additions to the explained embodiments going beyond this disclosure are conceivable without departing from the basic concept of the disclosure explained.

This basic concept consists, among other things, in providing an object in which the magnetic element (26) of a signaling means (24) can be disposed in a radially and rotationally fixed manner on a rotor shaft (16) without adhesive joints.

For this purpose, the described embodiments have a ferromagnetic retaining element (28) that, in one further development, is equipped with a fixing device that can be designed or produced differently. In addition to the illustrated and described fixing devices on the retaining element, other designs can alternatively also be used. For example, the fixing devices can also comprise axially projecting knobs or projections on the retaining element that, for example, engage in recesses provided for this purpose on the magnetic element while forming a force connection.

The invention claimed is:

1. An electronically commutated motor, comprising:
    a rotor on a rotor shaft, the rotor configured to rotate upon actuation; and
    a signaling means configured to detect an angle of rotation of the rotor and/or of the rotor shaft, the signaling means including a retaining element which is anchored to the rotor shaft in a rotationally fixed manner, and a magnetic element which is disposed on the retaining element, wherein
    the retaining element is a cup-shaped retaining element which is made of ferromagnetic material and into the interior of which the rotor shaft projects in portions such that a retaining element base of said retaining element covers an end face of the rotor shaft at least in regions, and
    the magnetic element is placed onto the retaining element base from the outside of the retaining element and is retained thereon by magnetic force.

2. The electronically commutated machine according to claim 1, wherein
    the retaining element is disposed in a rotationally fixed manner on the circumference of the rotor shaft by a clamping body that is located between an inner diameter of the retaining element and an outer diameter of said rotor shaft and is radially preloaded.

3. The electronically commutated machine according to claim 2, wherein
    at least one fixing device is formed on the retaining element and configured for form-fitting fastening of the magnetic element in and against the direction of rotation of the rotor shaft.

4. The electronically commutated machine according to claim 3, wherein
    the at least one fixing device is formed in one piece with the retaining element.

5. The electronically commutated machine according to claim 3, wherein:
    the at least one fixing device has a tab that projects axially from the retaining element and
    the magnetic element has a flattened portion on the circumference, which flattened portion is associated with said tab.

6. The electronically commutated machine according to claim 3, wherein
    the at least one fixing device of the retaining element is formed by punching and bending a segment of the retaining element.

7. The electronically commutated machine according to claim 3, wherein
    the at least one fixing device is formed solely by reshaping the retaining element.

8. The electronically commutated machine according to claim 1, wherein
    the magnetic element is disposed free of adhesive on the retaining element in a radially, axially and rotationally fixed manner.

9. An electronically slip-controllable braking system for a motor vehicle, comprising:
    a pressure generator; and
    an electronically commutated machine according to claim 1 as a drive for said pressure generator.

* * * * *